(12) United States Patent
Xie et al.

(10) Patent No.: US 8,890,462 B2
(45) Date of Patent: Nov. 18, 2014

(54) STEPPER MOTOR WITH COMMON SOLENOID CURRENT DRIVER

(75) Inventors: Zhe Xie, Rochester, MI (US); Timothy P. Philippart, Orion, MI (US); Philip C. Lundberg, Keego Harbor, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 300 days.

(21) Appl. No.: 13/415,310

(22) Filed: Mar. 8, 2012

(65) Prior Publication Data
US 2013/0234568 A1 Sep. 12, 2013

(51) Int. Cl.
*H02P 8/00* (2006.01)

(52) U.S. Cl.
USPC .......................... 318/696; 318/685; 318/280

(58) Field of Classification Search
USPC ......... 318/696, 685, 280, 286, 439, 452, 376, 318/282
See application file for complete search history.

(56) References Cited

U.S. PATENT DOCUMENTS

| | | | | | |
|---|---|---|---|---|---|
| 4,121,144 | A | * | 10/1978 | Leenhouts | 318/696 |
| 5,006,773 | A | * | 4/1991 | Goldberg | 318/696 |
| 5,415,480 | A | * | 5/1995 | Kikugawa | 400/144.2 |
| 6,285,155 | B1 | * | 9/2001 | Maske et al. | 318/685 |

* cited by examiner

*Primary Examiner* — Karen Masih

(57) ABSTRACT

A stepper motor assembly includes a unipolar winding stepper motor, four drivers, and a transmission control module. The stepper motor has four coil parts. Each driver has a transistor connected to one of the coil parts. Each driver is operable to drive a phase of the stepper motor, where first and second phases are opposites of each other and third and fourth phases are opposites of each other. The transmission control module houses the four transistors. A transmission is also disclosed that includes the disclosed stepper motor assembly.

18 Claims, 2 Drawing Sheets

STEPPER MOTOR WITH COMMON SOLENOID CURRENT DRIVER

FIELD

The present invention relates to stepper motor assemblies. More specifically, the present invention relates to stepper motor assemblies for use in automotive transmissions.

BACKGROUND

The statements in this section merely provide background information related to the present disclosure and may or may not constitute prior art.

A continuously variable transmission ("CVT") typically includes gearing that operatively couples a variator between a rotary power source, such as an engine or electric motor, and a final drive unit. The variator includes a rotary input disk and a rotary output disk which are able to steplessly or continuously vary the ratio of an input speed to an output speed (the "variator ratio"). The overall speed ratio provided by the CVT is a function of the variator ratio and the associated gearing. The output disc may include integrally formed gear teeth that are in mesh with and drive a corresponding gear. The gear in turn is functionally coupled to an output shaft or layshaft that is functionally coupled to the final drive unit.

Some CVTs use bipolar stepper motors for variator ratio control. These stepper motors require complex control to drive each winding in two directions, which typically involves using an H-bridge driver for each winding. Accordingly, a system designer needs to find packaging space for four H-bridge drivers, but designers are constantly looking to reduce the need for extra space.

SUMMARY

A stepper motor assembly is provided that uses four regular solenoid drivers in a transmission control module to drive a unipolar winding stepper motor.

In one variation, a stepper motor assembly is provided that includes a unipolar winding stepper motor. The unipolar winding stepper motor has first, second, third, and fourth coil parts. The first driver has a first transistor connected to an end of the first wire, and the first driver is operable to drive a first phase of the stepper motor. The second driver has a second transistor connected to an end of the second wire. The second driver is operable to drive a second phase of the stepper motor that is opposite the first phase. The third driver has a third transistor connected to an end of the third wire, and the third driver is operable to drive a third phase of the stepper motor. The fourth driver has a fourth transistor connected to an end of the fourth wire. The fourth driver is operable to drive a fourth phase of the stepper motor that is opposite the third phase. A transmission control module houses the first, second, third, and fourth transistors.

In another variation, which can be combined with or separate from the other variations described herein, a stepper motor assembly includes a unipolar winding stepper motor that has a first coil part extending from a first wire end to a first wire node, a second coil part extending from a second wire end to a second wire node, a third coil part extending from a third wire end to a third wire node, and a fourth coil part extending from a fourth wire end to a fourth wire node. A first center wire is connected to the first and second wire nodes, and a second center wire is connected to the third and fourth wire nodes.

The assembly also includes four drivers that are operable to control the unipolar stepper motor with pulse-width modulation. The first driver has a first metal-oxide-semiconductor field-effect transistor (MOSFET) connected to the first wire end. Each driver has a diode. The first driver's diode has a first cathode connected to the first center wire and a first anode connected to the first MOSFET. The first driver is operable to drive a first phase of the stepper motor. The second driver includes a second MOSFET connected to the second wire end. The second driver's diode has a second cathode connected to the first center wire and a second anode connected to the second MOSFET. The second driver is operable to drive a second phase of the stepper motor that is opposite the first phase. The third driver includes a third MOSFET connected to the third wire end. The third driver's diode has a third cathode connected to the second center wire and a third anode connected to the third MOSFET. The third driver is operable to drive a third phase of the stepper motor. The fourth driver includes a fourth MOSFET connected to the fourth wire end. The fourth driver's diode has a fourth cathode connected to the second center wire and a fourth anode connected to the fourth MOSFET. The fourth driver is operable to drive a fourth phase of the stepper motor that is opposite the third phase. A transmission control module houses the first, second, third, and fourth MOSFETs.

In another variation, which may be combined with or separate from the other variations described herein, a transmission is disclosed. The transmission includes an input element and an output element. A variator variably couples the input element and the output element. A unipolar stepper motor is operable to move the variator to vary the ratio of input to output torque between the input element and the output element. The stepper motor includes a first coil part having a first wire end, a second coil part having a second wire end, a third coil part having a third wire end, and a fourth coil part having a fourth wire end. A first driver has a first transistor connected to the first wire end, and the first driver is operable to drive a first phase of the stepper motor. A second driver has a second transistor connected to the second wire end. The second driver is operable to drive a second phase of the stepper motor that is opposite the first phase. A third driver has a third transistor connected to the third wire end, and the third driver is operable to drive a third phase of the stepper motor. A fourth driver has a fourth transistor connected to the fourth wire end. The fourth driver is operable to drive a fourth phase of the stepper motor that is opposite the third phase. A transmission control module houses the transistors.

Further features, advantages, and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way. The components in the figures are not necessarily to scale, emphasis instead being placed upon illustrating the principles of the invention. Moreover, in the figures, like reference numerals designate corresponding parts throughout the views. In the drawings.

DETAILED DESCRIPTION

The following description is merely exemplary in nature and is not intended to limit the present disclosure, application, or uses.

Figure 1:
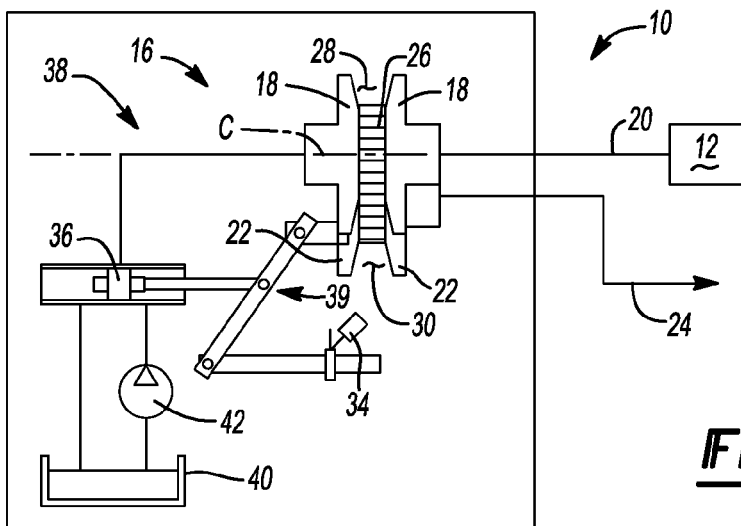
FIG. 1 is a schematic diagram of a powertrain for a motor vehicle in accordance with the principles the present invention.

Referring now to FIG. 1, a powertrain embodying the principles of the present invention is designated as 10. The powertrain 10 generally includes an engine 12 interconnected with a transmission 14. The engine 12 may be a conventional internal combustion engine or an electric motor, or any other type of prime mover, without departing from the scope of the present disclosure. The engine 12 supplies a driving torque to the transmission 14 through, for example, a flexplate or other connecting device or a starting device (not shown) such as a hydrodynamic device or launch clutch.

The transmission 14 is a continuously variable transmission (CVT). The transmission 14 includes a typically cast, metal housing which encloses and protects the various components of the transmission 14. The housing includes a variety of apertures, passageways, shoulders and flanges which position and support these components. Generally speaking, the transmission 14 includes a transmission input shaft 20 and a transmission output shaft 22. The transmission 14 is configured to provide forward and reverse speed or gear ratios between the transmission input shaft 20 and the transmission output shaft 22. The transmission input shaft 20 is functionally interconnected with the engine 12 and receives input torque or power from the engine 12. The transmission output shaft 22 is preferably connected with a final drive unit (not shown) which includes, for example, a propshaft, a differential assembly, and drive axles connected to wheels, etc.

The transmission 14 generally includes one or more gear sets, clutches and/or brakes, and shafts. The transmission includes a variator 16, which is illustrated as a pulley and belt type, though it should be understand that any other type of variator could be used, without falling beyond the spirit and scope of the present invention. For example, a toroidal CVT could be used that has a set of discs variably coupling input and output toroidal members. In the illustrated embodiment, the variator 16 includes a pair of input pulleys 18 that are coupled to the input shaft 20 and a pair of output pulleys 22 that are coupled to the output shaft 24. The output shaft 24 may be coupled to a final drive unit (not shown), or another gear set (not shown), by way of example. Each pulley 18, 22 has a generally conical outer surface in this embodiment, through other shapes, such as toroids, could be used in other variations. A belt 26 variably couples the input pulleys 18 to the output pulleys 22. Accordingly, the belt 26 is operable to transfer input torque from the input pulleys 18 to the output pulleys 22.

Thus, the variator 26 couples the engine 12, through the input shaft 20 and input pulleys 18, to the output shaft 24 and output pulleys 22. This is a "variable" coupling because the belt 26 can be moved within the groove 28 between the input pulleys 18, and it may also be movable within the groove 30 of the output pulleys 22, if desired. In other words, the pulleys 18, 22 may be moved closer to each other or farther apart from each to move the belt 26 into and out of the grooves 28, 30. As the input pulleys 18 move closer to each other, the belt 26 is forced away from the central axis C of the input pulleys 18, and as the input pulleys 18 move farther apart from each other, the belt 26 moves down the cone toward the central axis C of the input pulleys 18. If the output pulleys 22 are also moveable closer and farther from each other, the belt 26 moves similarly within the groove 30 of the output pulleys 22. As the belt 26 moves into and out of either of the grooves 28, 30 between the pulleys 18, 22, the torque ratio is varied between the input and output pulleys 18, 22, and thus also between the input and output shafts 20, 24. In other words, the variator varies the ratio of input to output torque in the transmission 14.

Accordingly, changes in the variator torque ratio are achieved by movement of either or both of the input and output pulleys 18, 22, which causes the coupling member (in this embodiment, the belt 26) to move within the grooves 28, 30 and thus change its location along the conical surfaces of one or both of the sets of pulleys 18, 22, which changes the belt's 26 radius of curvature. The changes of the radii of the belt 26 paths within the grooves 28, 30 results in a change of variator drive ratio between the input pulleys 18 and the output pulleys 22.

The transmission 14 has a stepper motor 34 that drives a shift control spool 36 of a hydraulic system 38 via a linkage 39, which adjusts the pulley clamping force to open and close one of more of the grooves 28, 30 to obtain a desired gear ratio. In other words, the stepper motor 34 position changes the spacing between one or more of the sets of pulleys 18, 22 by moving the shift control spool 36 to control the hydraulic feed to the sets of pulleys 18, 22 via the circuit 38. For example, the hydraulic pressure on the set of input pulleys 18 may change the gear ratio along with the line pressure that sustains the set of output pulleys 22. Fluid for the hydraulic control circuit 38 may be pulled from an oil pan 40 via a pump 42. Thus, the stepper motor 34 is operable to move the variator to vary the input and output torque ratio.

Figure 2:
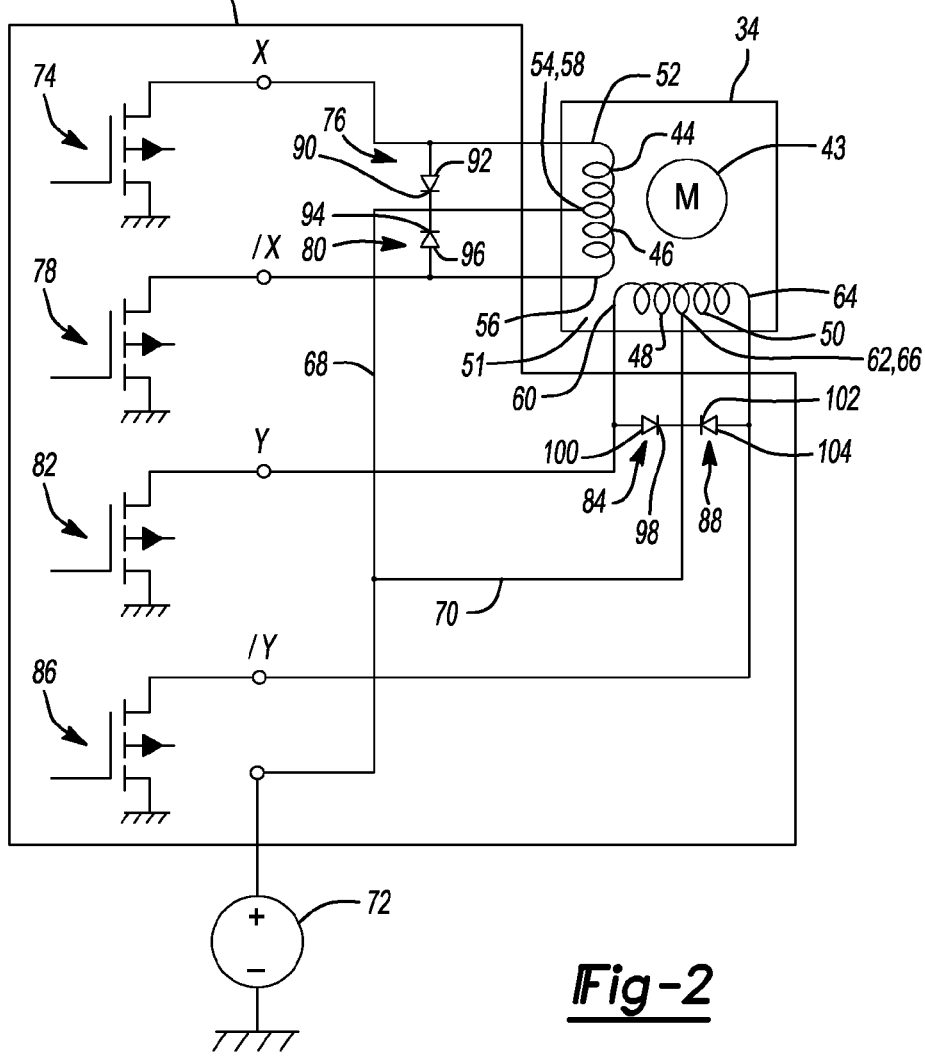
FIG. 2 is a schematic diagram of a stepper motor assembly, according to the principles of the present invention.

Referring now to FIG. 2, the stepper motor 34 and its drivers are illustrated. The stepper motor 34 is a unipolar winding stepper motor. It has a rotor 43 that is moved when coils are energized. The stepper motor 34 has a first coil part 44, a second coil part 46, a third coil part 48, and a fourth coil part 50. When any or more than one of the coil parts 44, 46, 48, 50 are energized, magnetic poles are generated in a stator portion 51 of the stepper motor 34, and the rotor 43 will align in accordance with the magnetic field developed in the stator portion 51, which varies based on which of the coil parts 44, 46, 48, 50 are energized.

In the illustrated embodiment, the following phase table describes the phases of the stepper motor 34, though other phase tables and configurations could be used without falling beyond the spirit and scope of the present disclosure. The stepper motor 34 has four phases, where Phase A(X) is the opposite of Phase B(/X), and Phase C(Y) is the opposite of Phase D(/Y).

TABLE 1

Phase Diagram for Stepper Motor 34.

| Phase | Positions of Rotor | | | | | | | |
|---|---|---|---|---|---|---|---|---|
| | 1 | 2 | 3 | 4 | 5 | 6 | 7 | 8 |
| A (X) | X | | | | | | X | X |
| B (/X) | | | X | X | X | | | |
| C (Y) | X | X | X | | | | | |
| D (/Y) | | | | | | X | X | X |

Table 1 in conjunction with FIG. 2 shows that a first position 1 of the rotor 43 can be maintained by activating the first and third phases A(X), C(Y) through energizing the first and third coil parts 44, 48. A second position 2 of the rotor 43 can be maintained by activating the third phase C(Y) through energizing the third coil part 48. A third position 3 of the rotor 43 can be maintained by activating the second and third phases B(/X), C(Y) through energizing the second and third coil parts 46, 48. A fourth position 4 of the rotor 43 can be maintained by activating the second phase B(/X) through energizing the second coil part 46. A fifth position 5 of the rotor 43 can be maintained by activating the second and fourth phases B(/X), D(/Y) through energizing the second and fourth coil parts 46, 50. A sixth position 6 of the rotor 43 can be maintained by activating the fourth phase D(/Y) through energizing the fourth coil part 50. A seventh position 7 of the rotor 43 can be maintained by activating the first and fourth phases A(X), D(/Y) through energizing the first and fourth coil parts 44, 50. An eighth position 8 of the rotor 43 can be maintained by activating the first phase A(X) through energizing the first coil part 44.

The first coil part 44 extends from a first wire end 52 to a first wire node 54. The second coil part 46 extends from a second wire end 56 to a second wire node 58, wherein the second wire node 58 overlaps with the first wire node 54. The third coil part 48 extends from a third wire end 60 to a third wire node 62. The fourth coil part 50 extends from a fourth wire end 64 to a fourth wire node 66, wherein the fourth wire node 66 overlaps with the third wire node 62. A first center wire 68 is connected to the first and second wire nodes 54, 58. A second center wire 70 is connected to the third and fourth wire nodes 62, 66. The first and second center wires 68, 70 are connected to a voltage source 72, in this embodiment.

A transmission control module (TCM) 73 contains and houses four regular solenoid drivers to drive the coil parts 44, 46, 48, 50 of the stepper motor 34. In other words, the same drivers that could be used to drive regular solenoids are used to drive the stepper motor 34. The first driver includes a first transistor 74 and a first diode 76. The first driver is operable to energize the first coil part 44 to drive the first phase A(X) of the stepper motor 34. The second driver includes a second transistor 78 and a second diode 80. The second driver is operable to energize the second coil part 46 to drive the second phase B(/X) of the stepper motor 34, where the second phase B(/X) is opposite the first phase A(X). The third driver includes a third transistor 82 and a third diode 84. The third driver is operable to energize the third coil part 48 to drive the third phase C(Y) of the stepper motor 34. The fourth driver includes a fourth transistor 86 and a fourth diode 88. The fourth driver is operable to energize the fourth coil part 50 to drive the fourth phase D(/Y) of the stepper motor 34, where the fourth phase D(/Y) is opposite the third phase C(Y). The first, second, third, and fourth drivers are operable to control the unipolar stepper motor with pulse-width modulation.

The first transistor 74 is connected to the first wire end 52; the second transistor 78 is connected to the second wire end 56; the third transistor 82 is connected to the third wire end 60; and the fourth transistor 86 is connected to the fourth wire end 64. Each diode 76, 80, 84, 88 has a cathode and an anode, and the anode is connected to a transistor, while the cathode is connected to a center wire. Thus, the first diode 76 has a first cathode 90 that is connected the first center wire 68 and a first anode 92 that is connected to the first transistor 74. The second diode 80 has a second cathode 94 that is connected the first center wire 68 and a second anode 96 that is connected to the second transistor 78. The third diode 84 has a third cathode 98 that is connected the second center wire 70 and a third anode 100 that is connected to the third transistor 82. The fourth diode 88 has a fourth cathode 102 that is connected the second center wire 70 and a fourth anode 104 that is connected to the fourth transistor 86. In some embodiments, however, the recirculation diodes 76, 80, 84, 88 could be omitted.

In the illustrated embodiment, both the transistors 74, 78, 82, 86 and the diodes 76, 80, 84, 88 are housed within the TCM, but in some embodiments, the diodes 76, 80, 84, 88 or the transistors 74, 78, 82, 86 may be located outside of the TCM. In the illustrated embodiment, each of the transistors 74, 78, 82, 86 is a first metal-oxide-semiconductor field-effect transistor (MOSFET), however, any suitable transistor could be used.

In the illustrated embodiment, the first and second center wires 68, 70 (that are connected to the coil parts 44, 46, 48, 50) are connected to the voltage source 72; and each of the transistors 74, 78, 82, 86 are connected to ground. It should be understood, however, that the ground and voltage connections could be reversed. For example, referring to FIG. 3, another embodiment of the stepper motor assembly is illustrated. Like the stepper motor assembly of FIG. 2, the stepper motor assembly of FIG. 3 includes the stepper motor 34' having a rotor 43', a stator portion 51', four coil parts 44', 46', 48', 50', and a TCM 73' housing four transistors 74', 78', 82', 86' and four diodes 76', 80', 84', 88'.

Figure 3:
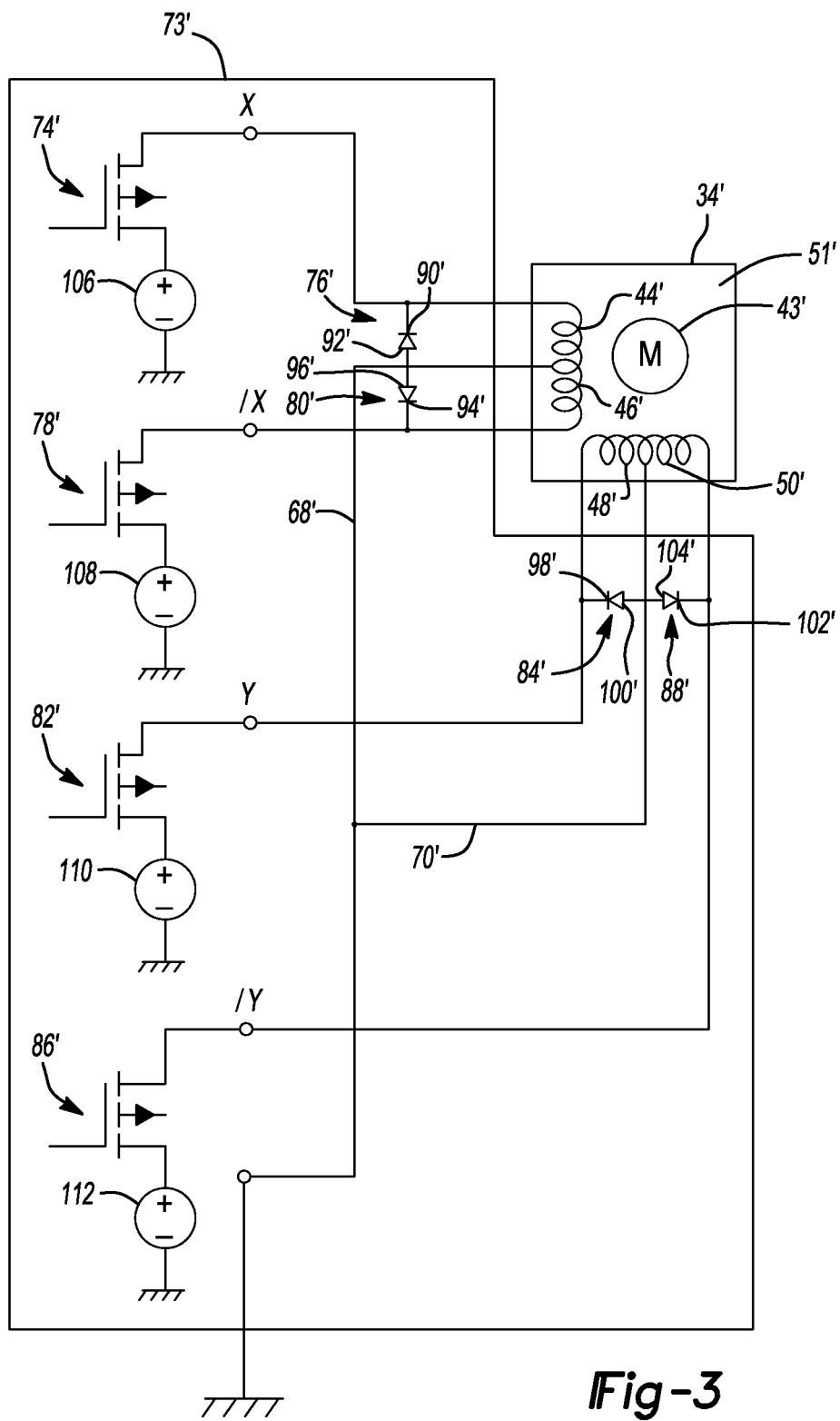
FIG. 3 is a schematic diagram of another stepper motor assembly, according to the principles of the present invention.

In the variation illustrated in FIG. 3, the first transistor 74' is connected to a first voltage source 106; the second transistor 78' is connected to a second voltage source 108; the third transistor 82' is connected to a third voltage source 110; and the fourth transistor 86' is connected to a fourth voltage source 112. One or more of the voltage sources 106, 108, 110, 112 could be combined if desired, such that more than one of the transistors 74', 78', 82', 86' are connected to the same voltage source 106, 108, 110, 112, and all of the transistors 74', 78', 82', 86' could be connected to a single voltage source, in some embodiments. The first and second center wires 68', 70' are connected to ground, in this embodiment. Accordingly, the direction of the diodes 76', 80', 84', 88' is reversed, such that each cathode 90', 94', 98', 102' is connected to a transistor 74', 78', 82', 86' and each anode 92', 96', 100', 104' is connected to a center wire 68', 70', as shown. Though illustrated within the TCM 73', the voltage sources 106, 108, 110, 112 need not be located in the TCM 73'.

In some variations, each coil part 44, 46, 48, 50 or 44', 46', 48', 50' is driven by a single transistor 74, 78, 82, 86 or 74', 78', 82', 86'. In the illustrated variations, each transistor 74, 78, 82, 86 or 74', 78', 82', 86' has a single output that is connected to one of the wire ends 52, 56, 60, 64 (FIG. 2; FIG. 3 has same single outputs) of the coil parts 44, 46, 48, 50 or 44', 46', 48', 50'. As such, each phase A(X), B(/X), C(Y), D(/Y) is driven by a single transistor 74, 78, 82, 86 or 74', 78', 82', 86' and by a single output from that transistor 74, 78, 82, 86 or 74', 78', 82', 86'. Therefore, in this embodiment, the unipolar stepper motor 34 is not driven by an H-bridge circuit because none of the drivers uses an H-bridge circuit. Rather, regular solenoid drivers are used. Thus, the TCM 73, 73' does not need an H-bridge. Instead, the TCM 73, 73' can employ the regular solenoid drivers, such as the transistors 74, 78, 82, 86 or 74', 78', 82', 86', with or without the diodes 76, 80, 84, 88 or 76', 80', 84', 88' to drive the coil parts 44, 46, 48, 50 or 44', 46', 48', 50' of the stepper motor 34, 34'.

The description of the invention is merely exemplary in nature and variations that do not depart from the gist of the invention are intended to be within the scope of the invention. Such variations are not to be regarded as a departure from the spirit and scope of the invention.

The invention claimed is:

1. A stepper motor assembly comprising:
a unipolar winding stepper motor comprising a first coil part having a first wire end, a second coil part having a second wire end, a third coil part having a third wire end, and a fourth coil part having a fourth wire end;
a first driver having a first transistor connected to the first wire end, the first driver operable to drive a first phase of the stepper motor;
a second driver having a second transistor connected to the second wire end, the second driver operable to drive a second phase of the stepper motor, the second phase being opposite the first phase;
a third driver having a third transistor connected to the third wire end, the third driver operable to drive a third phase of the stepper motor;
a fourth driver having a fourth transistor connected to the fourth wire end, the fourth driver operable to drive a fourth phase of the stepper motor, the fourth phase being opposite the third phase;
a transmission control module housing the first, second, third, and fourth transistors, and
a first center wire connected to the first and second coil parts and a second center wire connected to the third and fourth coil parts; and
wherein each of the transistors is a metal-oxide-semiconductor field-effect transistor, MOSFET.

2. The stepper motor assembly of claim 1, wherein the first coil part extends from the first wire end to a first wire node, the second coil part extends from the second wire end to a second wire node, the third coil part extends from the third wire end to a third wire node, the fourth coil part extends from the fourth wire end to a fourth wire node, the first center wire is connected to the first and second wire nodes, and the second center wire is connected to the third and fourth wire nodes.

3. The stepper motor assembly of claim 2, further comprising at least one voltage source connected to the first and second center wires.

4. The stepper motor assembly of claim 3, wherein each of the transistors is connected to ground.

5. The stepper motor assembly of claim 2, wherein the first and second center wires are connected to ground.

6. The stepper motor assembly of claim 5, further comprising at least one voltage source connected to the first, second, third, and fourth transistors.

7. The stepper motor assembly of claim 2, wherein the first driver includes a first diode having a first cathode and a first anode, the first cathode being connected to the first center wire and the first anode being connected to the first transistor; the second driver includes a second diode having a second cathode and a second anode, the second cathode being connected to the first center wire and the second anode being connected to the second transistor; the third driver includes a third diode having a third cathode and a third anode, the third cathode being connected to the second center wire and the third anode being connected to the third transistor; and the fourth driver includes a fourth diode having a fourth cathode and a fourth anode, the fourth cathode being connected to the second center wire and the fourth anode being connected to the fourth transistor.

8. The stepper motor assembly of claim 2, wherein the unipolar stepper motor is driven by a regular solenoid driver.

9. The stepper motor assembly of claim 2, further comprising a variator for varying the ratio of input to output torque in a transmission, the stepper motor being operable to move the variator.

10. The stepper motor assembly of claim 9, further comprising an transmission input element and a transmission output element, the variator comprising a coupling element that variably couples the transmission input element to the transmission output element, and the variator operable to vary the ratio of input to output torque between the transmission input element and the transmission output element.

11. The stepper motor of assembly claim 10, wherein the first, second, third, and fourth drivers are operable to control the stepper motor with pulse-width modulation.

12. A stepper motor assembly comprising:
a unipolar winding stepper motor comprising a first coil part extending from a first wire end to a first wire node, a second coil part extending from a second wire end to a second wire node, a third coil part extending from a third wire end to a third wire node, and a fourth coil part extending from a fourth wire end to a fourth wire node;
a first center wire connected to the first and second wire nodes;
a second center wire connected to the third and fourth wire nodes;
a first driver including a first metal-oxide-semiconductor field-effect transistor, MOSFET, connected to the first wire end, the first driver including a first diode having a first cathode and a first anode, the first cathode being connected to the first center wire and the first anode being connected to the first MOSFET, the first driver operable to drive a first phase of the stepper motor;
a second driver including a second MOSFET connected to the second wire end, the second driver including a second diode having a second cathode and a second anode, the second cathode being connected to the first center wire and the second anode being connected to the second MOSFET, the second driver operable to drive a second phase of the stepper motor, the second phase being opposite the first phase;
a third driver including a third MOSFET connected to the third wire end, the third driver including a third diode having a third cathode and a third anode, the third cathode being connected to the second center wire and the third anode being connected to the third MOSFET, the third driver operable to drive a third phase of the stepper motor;
a fourth driver including a fourth MOSFET connected to the fourth wire end, the fourth driver including a fourth diode having a fourth cathode and a fourth anode, the fourth cathode being connected to the second center wire and the fourth anode being connected to the fourth MOSFET, the fourth driver operable to drive a fourth phase of the stepper motor, the fourth phase being opposite the third phase; and
a transmission control module housing the first, second, third, and fourth MOSFETs,
wherein the first, second, third, and fourth drivers are operable to control the unipolar stepper motor with pulse-width modulation.

13. A transmission comprising:
an input element;
an output element;
a variator having a coupling element that variably couples the input element and the output element, the variator operable to vary the ratio of input to output torque between the input element and the output element;
a unipolar winding stepper motor operable to move the variator to vary the ratio of input to output torque between the input element and the output element, the stepper motor comprising a first coil part having a first wire end, a second coil part having a second wire end, a third coil part having a third wire end, and a fourth coil part having a fourth wire end;

a first driver having a first transistor connected to the first wire end, the first driver operable to drive a first phase of the stepper motor;

a second driver having a second transistor connected to the second wire end, the second driver operable to drive a second phase of the stepper motor, the second phase being opposite the first phase;

a third driver having a third transistor connected to the third wire end, the third driver operable to drive a third phase of the stepper motor;

a fourth driver having a fourth transistor connected to the fourth wire end, the fourth driver operable to drive a fourth phase of the stepper motor, the fourth phase being opposite the third phase; and a transmission control module housing the first, second, third, and fourth transistors.

14. The transmission of claim 13, wherein each of the transistors is a metal-oxide-semiconductor field-effect transistor, MOSFET.

15. The transmission of claim 14, further comprising a first center wire connected to the first and second coil parts and a second center wire connected to the third and fourth coil parts.

16. The transmission of claim 15, wherein the first coil part extends from the first wire end to a first wire node, the second coil part extends from the second wire end to a second wire node, the third coil part extends from the third wire end to a third wire node, the fourth coil part extends from the fourth wire end to a fourth wire node, the first center wire is connected to the first and second wire nodes, and the second center wire is connected to the third and fourth wire nodes.

17. The transmission of claim 16, wherein the first driver includes a first diode having a first cathode and a first anode, the first cathode being connected to the first center wire and the first anode being connected to the first transistor; the second driver includes a second diode having a second cathode and a second anode, the second cathode being connected to the first center wire and the second anode being connected to the second transistor; the third driver includes a third diode having a third cathode and a third anode, the third cathode being connected to the second center wire and the third anode being connected to the third transistor; and the fourth driver includes a fourth diode having a fourth cathode and a fourth anode, the fourth cathode being connected to the second center wire and the fourth anode being connected to the fourth transistor.

18. The transmission of claim 17, wherein the first, second, third, and fourth drivers are operable to control the stepper motor with pulse-width modulation.

* * * * *